US010288861B2

(12) United States Patent
Shimada

(10) Patent No.: US 10,288,861 B2
(45) Date of Patent: May 14, 2019

(54) LIGHT SHEET MICROSCOPE AND CONTROL METHOD OF LIGHT SHEET MICROSCOPE

(71) Applicant: OLYMPUS CORPORATION, Hachioji-shi, Tokyo (JP)

(72) Inventor: Yoshihiro Shimada, Sagamihara (JP)

(73) Assignee: OLYMPUS CORPORATION, Tokyo (JP)

(*) Notice: Subject to any disclaimer, the term of this patent is extended or adjusted under 35 U.S.C. 154(b) by 7 days.

(21) Appl. No.: 15/655,382

(22) Filed: Jul. 20, 2017

(65) Prior Publication Data

US 2018/0031816 A1 Feb. 1, 2018

(30) Foreign Application Priority Data

Jul. 29, 2016 (JP) .................................. 2016-149530

(51) Int. Cl.
*G02B 21/00* (2006.01)
*G02B 27/00* (2006.01)
(Continued)

(52) U.S. Cl.
CPC .......... *G02B 21/006* (2013.01); *G02B 5/005* (2013.01); *G02B 15/14* (2013.01);
(Continued)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 9,423,600 B2 * 8/2016 Matsumoto ........ G02B 21/0068
9,500,845 B2 * 11/2016 Yokoi .................... G02B 21/16
(Continued)

FOREIGN PATENT DOCUMENTS

DE 10127284 A1 12/2002
DE 102007017598 A1 10/2008
(Continued)

OTHER PUBLICATIONS

Extended European Search Report (EESR) dated Dec. 14, 2017 issued in counterpart European Application No. 17181645.7.

*Primary Examiner* — Arnel C Lavarias
(74) *Attorney, Agent, or Firm* — Holtz, Holtz and Volek PC

(57) ABSTRACT

A light sheet microscope includes an objective, an illumination optical system, a correction device, an image pickup device, a first adjustor, a second adjustor and a controller. The controller performs a first focus process and a spherical aberration correction process. The first focus process is a process in which the first adjustor is controlled on the basis of light that is from the light sheet plane and that is detected via the objective so that the light sheet plane and a focal plane become closer when a relative position between the light sheet plane and a sample has been changed. The spherical aberration correction process is a process in which the correction device is controlled so that an evaluation value of the image obtained by the image pickup device becomes greater when the first adjustor has changed the relative position between the light sheet plane and the objective.

20 Claims, 9 Drawing Sheets

(51) Int. Cl.
*G02B 21/24* (2006.01)
*G02B 21/36* (2006.01)
*G02B 5/00* (2006.01)
*G02B 15/14* (2006.01)

(52) U.S. Cl.
CPC ..... *G02B 21/0004* (2013.01); *G02B 21/0032* (2013.01); *G02B 21/241* (2013.01); *G02B 21/245* (2013.01); *G02B 21/365* (2013.01); *G02B 21/367* (2013.01); *G02B 27/0025* (2013.01)

(58) Field of Classification Search
CPC .............. G02B 21/0052; G02B 21/006; G02B 21/0076; G02B 21/06; G02B 21/08; G02B 21/082; G02B 21/18; G02B 21/24; G02B 21/241; G02B 21/242; G02B 21/244; G02B 21/36; G02B 21/361
USPC ....... 359/362, 363, 368, 369, 379, 385, 388, 359/389, 390, 434, 435
See application file for complete search history.

(56) References Cited

U.S. PATENT DOCUMENTS

| | | |
|---|---|---|
| 2004/0129858 A1 | 7/2004 | Czarnetzki et al. |
| 2014/0233094 A1 | 8/2014 | Ue et al. |
| 2015/0286042 A1 | 10/2015 | Hilbert et al. |
| 2017/0168280 A1* | 6/2017 | Schumann ......... G02B 27/0025 |

FOREIGN PATENT DOCUMENTS

| | | |
|---|---|---|
| DE | 102014101762 A1 | 8/2015 |
| EP | 2653902 A1 | 10/2013 |
| EP | 3035104 A2 | 6/2016 |
| JP | 2014160213 A | 9/2014 |
| JP | 2015537236 A | 12/2015 |
| WO | 2014056992 A1 | 4/2014 |
| WO | 2015184124 A1 | 12/2015 |

\* cited by examiner

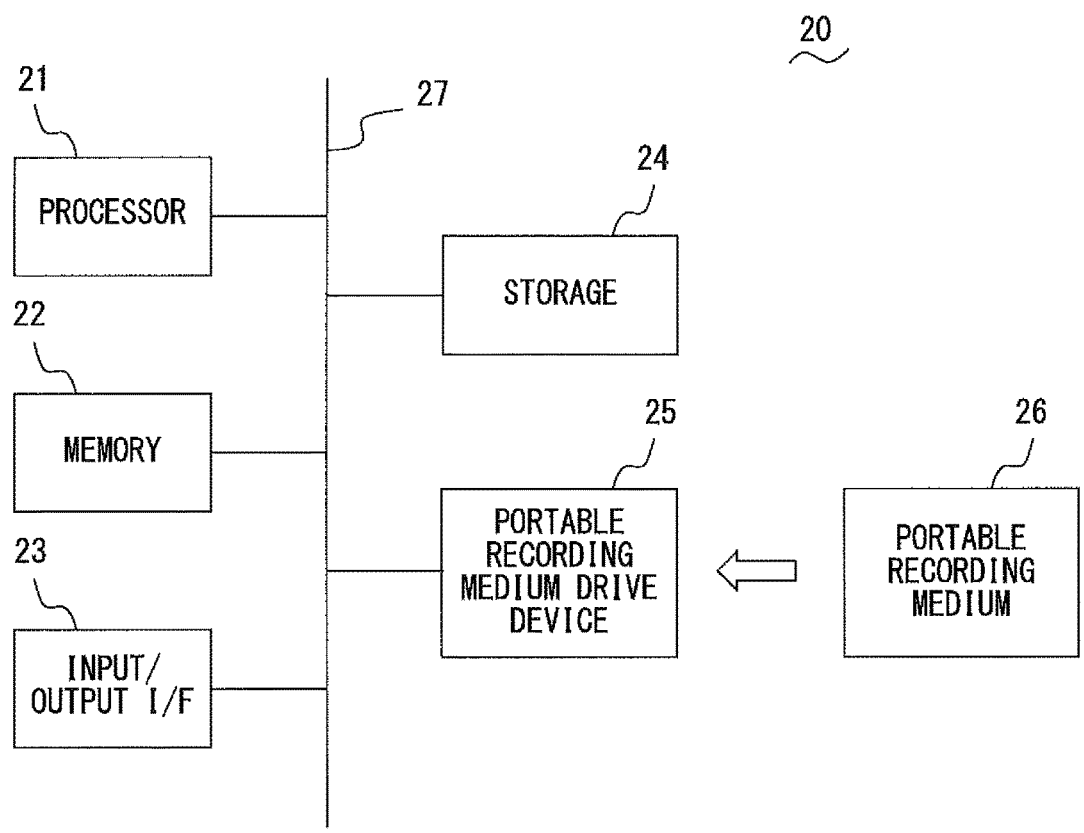
F I G. 2

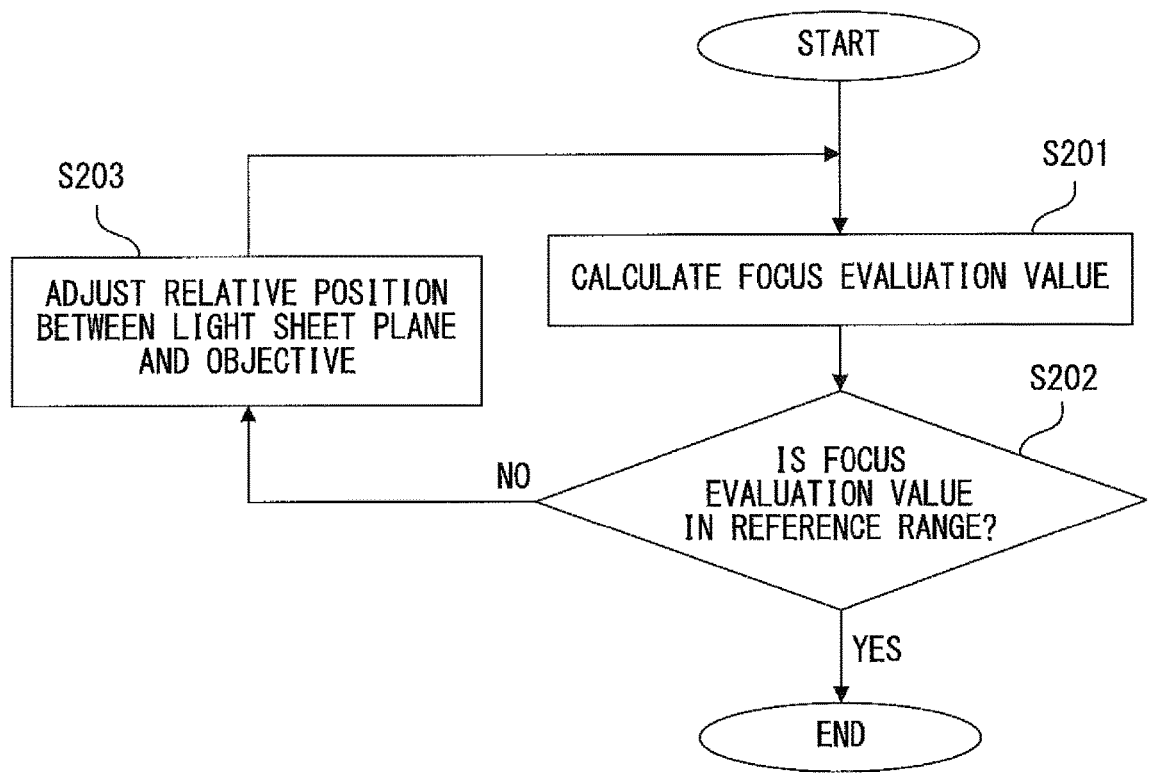
F I G. 4

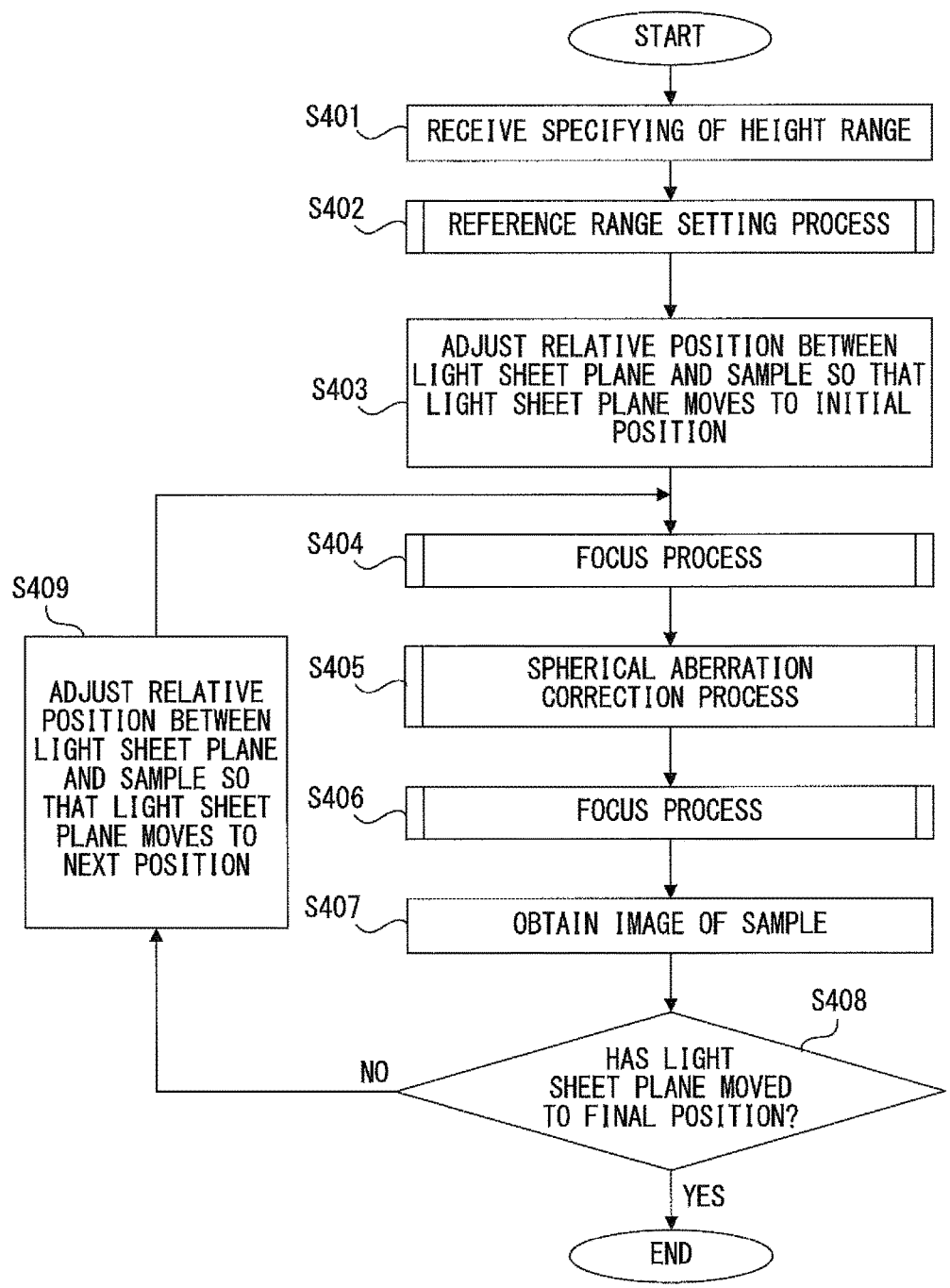
F I G. 7

LIGHT SHEET MICROSCOPE AND CONTROL METHOD OF LIGHT SHEET MICROSCOPE

CROSS REFERENCE TO RELATED APPLICATIONS

This application is based upon and claims the benefit of priority from prior Japanese Patent Application No. 2016-149530, filed Jul. 29, 2016, the entire contents of which are incorporated herein by this reference.

BACKGROUND OF THE INVENTION

Field of the Invention

The disclosure of the present invention is related to a light sheet microscope and a control method of a light sheet microscope.

Description of the Related Art

In the field of fluorescence microscopes, a technique is known in which a sample is irradiated with a laser beam from a direction that is orthogonal to the optical axis of the objective so as to form a light sheet in the sample. A light sheet microscope using this technique is disclosed in for example U.S. Unexamined Patent Application Publication No 2015/0286042 and International Publication Pamphlet No. WO2015/184124. Light sheet microscopes can generate an excellent 3-D image of a sample at a high speed with suppressed fading of fluorescence.

In recent years, purposes of this technique are not limited to obtaining of an image of a creature such as zebrafish that is labeled with fluorescent protein as a target molecule. This technique draws attention also as a technique aiming to be applied to so-called "drug-discovery screening", in which medical effects are evaluated by obtaining a 3-D image of a 3-D cultured cell such as spheroid or organoid and using an image analysis technique. This technique is expected to be applied to a wide range of applications.

SUMMARY OF THE INVENTION

A light sheet microscope according to an aspect of the present invention includes an objective, an illumination optical system that irradiates a sample with a light sheet from a direction that is different from an optical axis direction of the objective, a correction device that corrects a spherical aberration, an image pickup device that obtains an image of the sample via the objective, a first adjustor that adjusts a relative position between a light sheet plane on which the light sheet is formed and the objective in the optical axis direction of the objective, a second adjustor that adjusts a relative position between the light sheet plane and the sample in the optical axis direction of the objective, and a controller that performs (i) a first focus process in which the first adjustor is controlled on the basis of light that is from the light sheet plane and that is detected via the objective so that the light sheet plane and the focal plane of the objective become closer when the second adjustor has changed the relative position between the light sheet plane and the sample and (ii) a spherical aberration correction process in which the correction device is controlled so that an evaluation value of the image of the sample obtained by the image pickup device becomes greater when the first adjustor has changed the relative position between the light sheet plane and the objective.

A control method according to an aspect of the present invention is a control method for a light sheet microscope having an objective, a correction device that corrects a spherical aberration and an image pickup device that obtains an image of a sample, the control method including irradiating the sample with light sheet from a direction that is different from an optical axis direction of the objective, adjusting a relative position between a light sheet plane on which the light sheet is formed and the sample in the optical axis direction of the objective, performing a first focus process in which a relative position between the light sheet plane and the objective is adjusted on the basis of light that is from the light sheet plane and that is detected via the objective so that the light sheet plane and the focal plane of the objective become closer when the relative position between the light sheet plane and the sample has been adjusted, and performing a spherical aberration correction process in which the correction device is controlled so that an evaluation value of the image of the sample obtained by the image pickup device becomes greater when the relative position between the light sheet plane and the objective has been adjusted.

BRIEF DESCRIPTION OF THE DRAWINGS

The present invention will be more apparent from the following detailed description when the accompanying drawings are referenced.

FIG. 2 exemplifies a hardware configuration of a controller 20;

FIG. 4 is a flowchart showing procedures of a focus process;

FIG. 6 exemplifies a configuration of a light shielding plate 19 having a pinhole array 19a;

FIG. 7 is a flowchart showing procedures of a cross-sectional-image obtainment process according to the second embodiment;

DESCRIPTION OF THE EMBODIMENTS

In order to obtain a 3-D image of a sample, a light sheet microscope usually obtains a plurality of cross-sectional images while relatively moving the light sheet and the sample along the observation optical axis (optical axis of the objective). In many cases, the light sheet and the objective are fixed after the light sheet is set to be formed on the focal plane of the objective. Then, a plurality of cross-sectional images are obtained by sequentially moving the sample in the optical axis direction.

In this method, however, a change of an observed location in the sample (i.e., a plane on which the light sheet is formed in the sample, which will be referred to as a light sheet plane) changes a component ratio of media between the objective and the light sheet plane (e.g., the ratio between the air, the culture solution and the inside of the sample). Thereby, the optical path length between the objective and the light sheet plane changes. This results in a situation where even when the objective is not moved, the focal plane of the objective moves in the optical axis directions and the focal plane of the objective does not coincide with the light sheet plane. Also, the movement amount of the focal plane changes depending upon the refractive-index distribution in the sample. Also, the influence caused by this difference becomes greater because the smaller the thickness of the sheet the more the optical resolution of a 3-D image is to be increased, i.e. the more the numerical aperture of the objective is to be increased and the more the thickness of the light sheet is to be reduced, the shallower the focal depth is.

U.S. Unexamined Patent Application Publication No 2015/0286042 and International Publication Pamphlet No. WO2015/184124 above disclose a technique that performs calibration by using the observation target before observation so as to generate data for correcting a difference of the focal plane of the objective. Using this technique can suppress a difference between the focal plane of the objective and the light sheet plane to some extent.

However, when the refractive index of a sample has a steep change inside or in other cases, it is difficult to suppress a difference with sufficient accuracy. By obtaining more images in calibration, it is possible to improve the correction accuracy. However, obtaining more images takes a longer time for calibration. Also, there is a risk that calibration may damage the sample. Further, a change in the optical path length between an objective and a light sheet plane also causes a change in the amount of a spherical aberration. Neither U.S. Unexamined Patent Application Publication No 2015/0286042 nor International Publication Pamphlet No. WP2015/184124 above takes a change in the amount of a spherical aberration into account.

Hereinafter, embodiments of the present invention will be described.

[First Embodiment]

Figure 1:
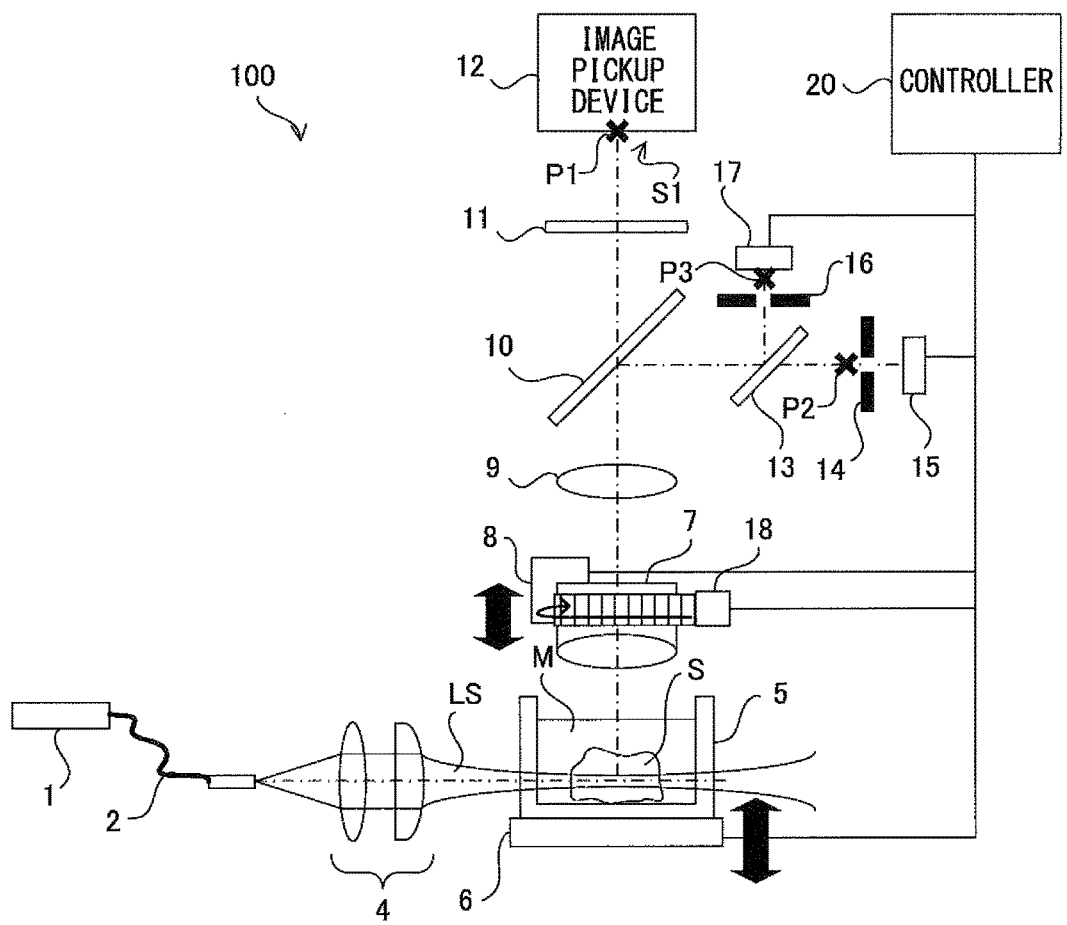
FIG. 1 exemplifies a configuration of a light sheet microscope 100 according to the first embodiment.

FIG. 1 exemplifies a configuration of a light sheet microscope 100 according to the present embodiment. The light sheet microscope 100 is an apparatus that obtains a cross-sectional image of sample S immersed in medium M such as culture solution, transparentization solution, etc. Sample S is for example a biological cell that was labeled by fluorochrome. Sample S is contained in for example a sample container 5 such as a cuvette etc. mounted on a stage 6.

The light sheet microscope 100 includes a laser 1, an optical fiber 2, a light sheet illumination optical system 4, the stage 6, a dry objective 7, a Z drive unit 8, an tube lens 9, a dichroic mirror 10, an emission filter 11, an image pickup device 12 and a correction collar 18.

The illumination optical system 4 includes for example a collector lens and a cylindrical lens. The illumination optical system 4 irradiates sample S with a light sheet from a direction different from the optical axis directions of the objective 7. More specifically, the light sheet illumination optical system 4 is arranged so that the outgoing optical axis of the light sheet illumination optical system 4 is roughly orthogonal to the optical axis of the objective 7. The light sheet illumination optical system 4 is configured to irradiate sample S with light sheet LS from a direction that is roughly orthogonal to the optical axis of the optical system of the objective 7. In this example, a light sheet is illumination light that forms a sheet-shaped illumination area. Light sheet LS has a sheet-like shape that is thin in the optical axis directions of the objective 7 in sample S. Also, "roughly orthogonal" refers to a range that may be considered by those skilled in the art as an error in setting or manufacturing from the orthogonal state.

The stage 6 is an electric stage that moves in the optical axis directions of the objective 7. The stage 6 is a second adjustor that adjusts the relative position between the light sheet plane and sample S in the optical axis directions of the objective 7. The movement of the stage 6 is controlled by a controller 20, which will be explained later.

The Z drive unit 8 is an electric unit that moves the objective 7 in the optical axis directions of the objective 7. The Z drive unit 8 is a first adjustor that adjusts the relative position between the light sheet plane on which light sheet LS is formed and the objective 7 in the optical axis directions of the objective 7. Movements of the objective 7 via the Z drive unit 8 are controlled by the controller 20, which will be described later.

The dichroic mirror 10 reflects a laser beam so as to split the incident beam into the laser beam and fluorescence. The emission filter 11 blocks a laser beam and transmits fluorescence. The dichroic mirror 10 and the emission filter 11 limit the entrance of a laser beam into the image pickup device 12.

The image pickup device 12 obtains, via the objective 7, an image of sample S that is irradiated with light sheet LS. The image pickup device 12 is for example a digital camera having a 2-D image sensor such as a CCD (Charge Coupled Device) image sensor, a CMOS (Complementary Metal Oxide Semiconductor) image sensor, etc. The image pickup device 12 has light-receiving surface 51, and is arranged in such a manner that the front-side focal position of the objective 7 is projected on the light-receiving surface 51. Position P1 on light-receiving surface 51 shown in FIG. 1 is the position at which the front-side focal position of the objective 7 is projected, i.e. the position that is optically conjugate with the front-side focal position of the objective 7.

The correction collar 18 is a correction device that corrects a spherical aberration. The correction collar 18 is an electric correction collar that moves a lens constituting the objective 7 in the optical axis directions of the objective 7. Correction of a spherical aberration by the correction collar 18 is controlled by the controller 20, which will be described later.

The light sheet microscope 100 further includes a beam splitter 13, two light shielding plates (pinhole plates 14 and 16) and two photodetectors (photodetectors 15 and 17) in the reflection optical path of the dichroic mirror 10 (the optical path branching, through the dichroic mirror 10, from the optical path between the image pickup device 12 and the objective 7).

The beam splitter 13 splits the laser beam reflected by the dichroic mirror 10 at a ratio of 50:50. The pinhole plate 14 and the photodetector 15 are arranged in one of the optical paths branched by the beam splitter 13. The pinhole plate 16 and the photodetector 17 are arranged on the other of the optical paths branched by the beam splitter 13.

The pinhole plate 14 is a first light shielding plate having an opening, and is arranged on the far side of position P2 at which the front-side focal position of the objective 7 is projected. The pinhole plate 16 is a second light shielding plate having an opening, and is arranged on the near side of position P3 at which the front-side focal position of the objective 7 is projected. Positions P2 and P3 are positions that are optically conjugate with the front-side focal position of the objective 7, and are, in other words, positions corresponding to light-receiving surface S1 (position P1) of the image pickup device 12. Hereinafter, positions P2 and P3 may respectively be referred to also as reference positions, as necessary. In this example, "near side" means a near side with respect to the traveling direction of the light, and "far side" means a far side with respect to the traveling direction of the light.

The photodetector 15 is a first photodetector that detects light that is from the light sheet plane and that passed through the pinhole plate 14, and detects a laser beam in a dedicated manner. The photodetector 17 is a second photodetector that detects light that is from the light sheet plane and that passed through the pinhole plate 16, and detects a laser beam in a dedicated manner. The photodetector 15 and the photodetector 17 are for example Photomultiplier Tubes (PMTs), and output a signal in accordance with a detected light amount.

The light sheet microscope 100 further includes the controller 20. The controller 20 is configured to perform a cross-sectional-image obtainment process of obtaining a plurality of cross-sectional images of sample S. The outline of the cross-sectional-image obtainment process is as below, although this process will be described later in detail.

In the cross-sectional image obtainment process, the controller 20 changes the relative position between the light sheet plane and sample S by controlling the stage 6 in order to obtain a plurality of cross-sectional images by irradiating different positions of sample S with a light sheet. Then, the refractive-index distribution in the medium between the light sheet plane and the objective 7 (including the air, medium M and the inside of sample S) changes, moving the focal plane of the objective 7 in the optical axis directions even when the objective 7 is not moved. Because of this, just controlling the stage 6 results in a difference between a light sheet plane and the focal plane of the objective. Thus, after controlling the stage 6, the controller 20 further controls the Z drive unit 8 on the basis of the light that is from the light sheet plane and that is detected via the objective 7, and adjusts the relative position between the light sheet plan and the objective 7. More specifically, the Z drive unit 8 is controlled so that the focal plane of the objective 7 is made closer to the light sheet plane and thereby the positions thereof coincide.

Further, a change in the refractive-index distribution in the medium between the light sheet plane and the objective 7 also causes a change in the amount of a spherical aberration. Accordingly, the controller 20, after controlling the Z drive unit 8, further controls the correction collar 18 so as to correct the spherical aberration in such a manner that the contrast or the brightness of an image of sample S obtained by the image pickup device 12 increases. This makes it possible to obtain a plurality of cross-sectional images having a spherical aberration that has been corrected with the focal plane of the objective 7 and the light sheet plane coinciding highly accurately.

FIG. 2 exemplifies a hardware configuration of the controller 20. The controller 20 is for example a standard computer, and includes a processor 21, a memory 22, an input/output interface 23, a storage 24 and a portable recording medium drive device 25 into which a portable recording medium 26 is inserted. They are connected to each other via a bus 27. Note that FIG. 2 shows an example of the hardware configuration of the controller 20, and the controller 20 is not limited to this configuration.

The processor 21 is for example a CPU (Central Processing Unit), an MPU (Micro Processing Unit), a DSP (Digital Signal Processor), etc., and executes a program so as to perform a programmed process such as for example the above cross-sectional-image obtainment process. The memory 22 is for example a RAM (Random Access Memory), and, temporarily stores a program or data that are recorded in the storage 24 or the portable recording medium 26 when the program is to be executed.

The input/output interface 23 is a circuit that exchanges a signal with devices other than the controller 20 (for example the stage 6, the Z drive unit 8, the photodetector 15, the photodetector 17, the correction collar 18, etc.). The storage 24 is for example a hard disk, a flash memory, etc. and is used mainly for recording various types of data and programs. The portable recording medium drive device 25 accommodates the portable recording medium 26 such as an optical disk, a CompactFlash (registered trademark), etc. The portable recording medium 26 plays a role of assisting the storage 24.

Figure 3:
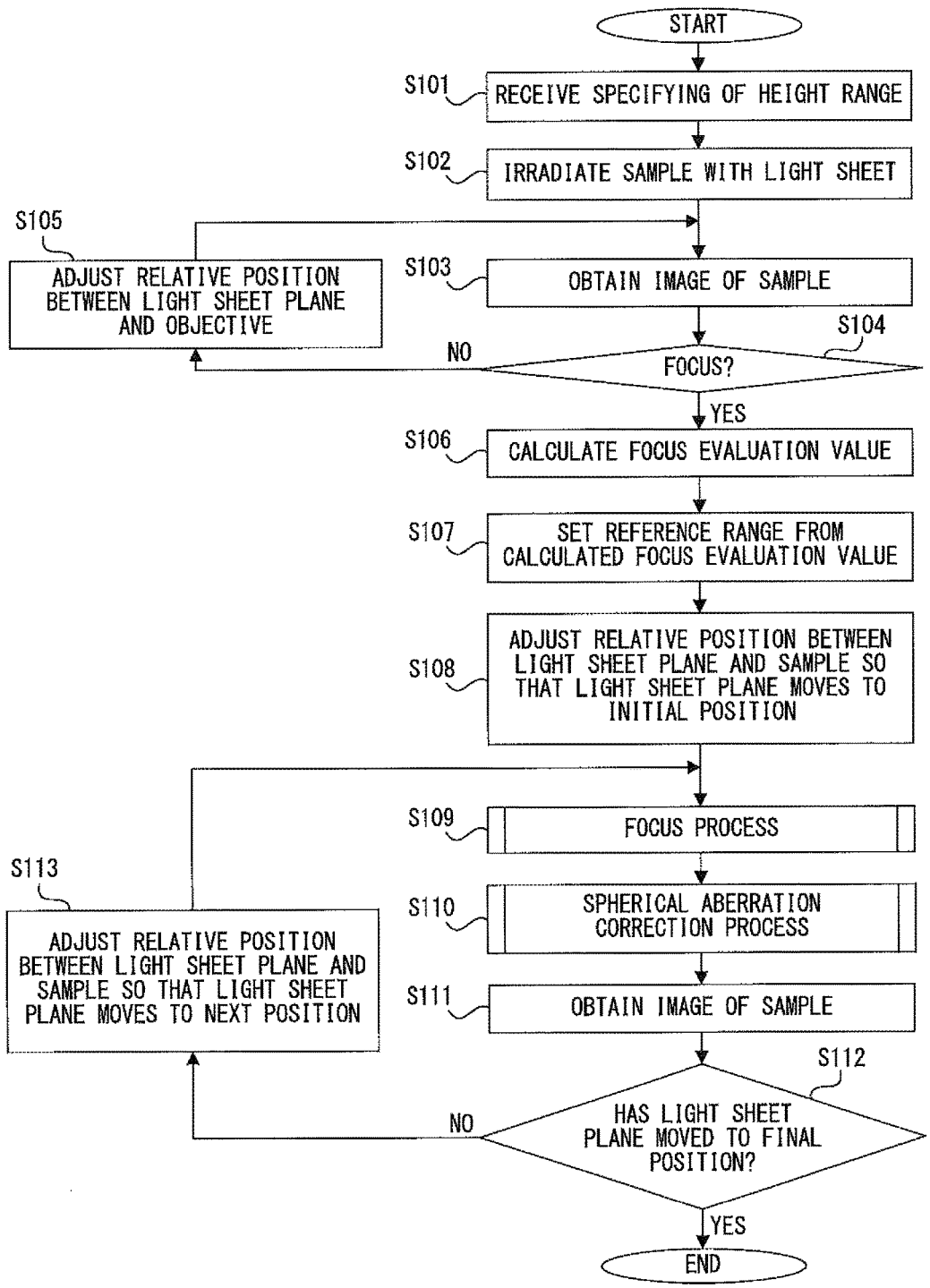
FIG. 3 is a flowchart showing procedures of a cross-sectional image obtainment process according to the first embodiment.
Figure 5:
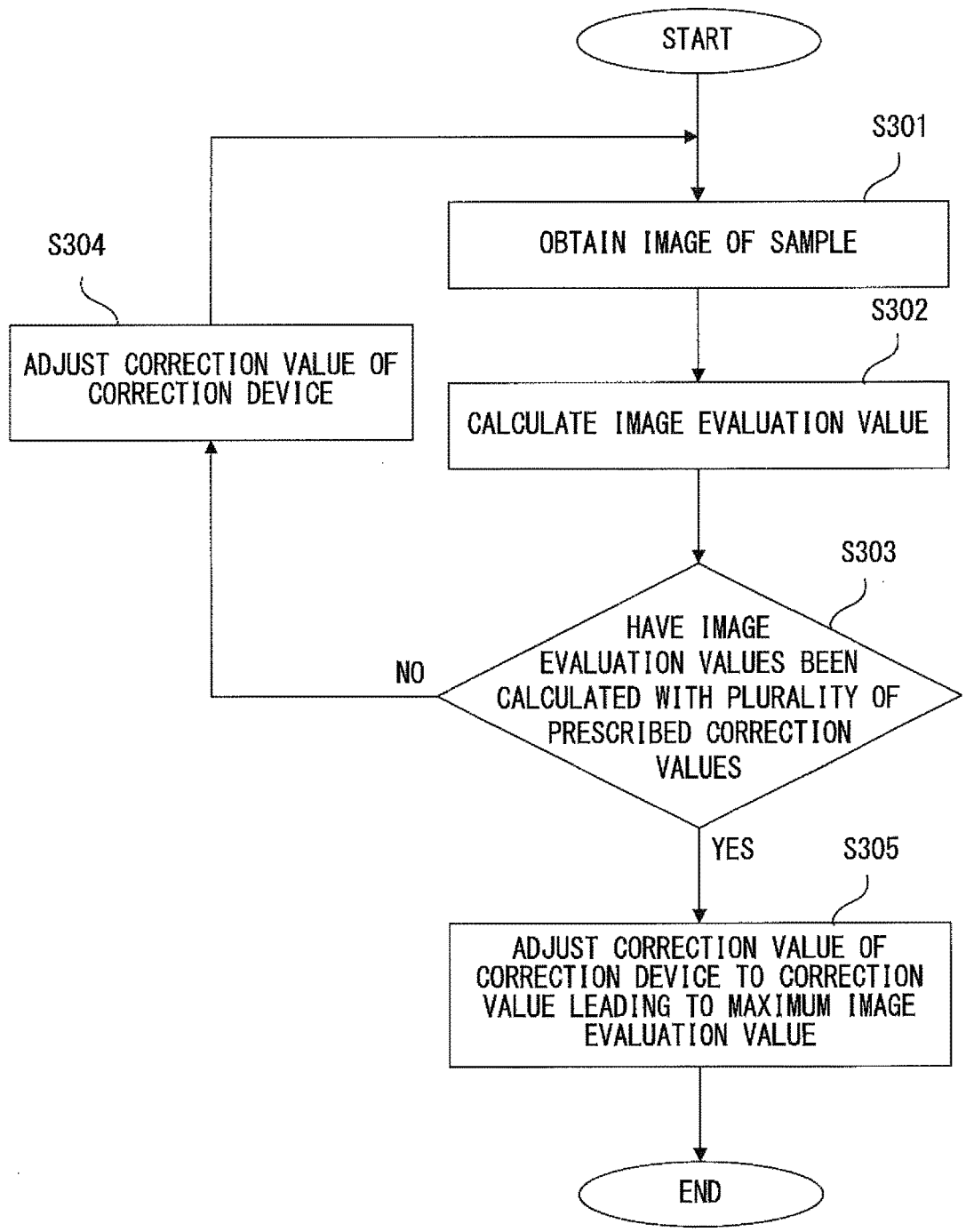
FIG. 5 a flowchart showing procedures of a spherical aberration correction process.

FIG. 3 is a flowchart showing procedures of a cross-sectional image obtainment process. FIG. 4 is a flowchart showing procedures of a focus process. FIG. 5 a flowchart showing procedures of a spherical aberration correction process. Hereinafter, while referring to FIG. 3 through FIG. 5, specific explanations will be given for a cross-sectional-image obtainment process performed by the light sheet microscope 100.

The light sheet microscope 100 first receives specifying of a height range in which cross-sectional images are obtained (step S101). In this example, when the user uses an input device (not shown) so as to input a height range in which cross-sectional images are obtained, the controller 20 receives the specifying of a height range. The controller 20 further determines, on the basis of the received height range, the positions at which cross-sectional images are obtained, i.e. the positions of the light sheet plane in sample S.

Next, the light sheet microscope 100 irradiates sample S with light sheet LS (step S102), and obtains an image of sample S (step S103). In this example, the position of the light sheet plane in sample S is not limited particularly. Accordingly, it is possible to irradiate an arbitrary position with light sheet LS so as to obtain an image of sample S, i.e. an image of a light sheet plane by using the image pickup device 12.

Thereafter, the light sheet microscope 100 makes a focus determination on the basis of the obtained image (step S104). In the determination, whether or not the focal plane of the objective 7 coincides with the light sheet plane is determined by for example the controller 20 on the basis of the contrast of the image. It is also possible to make a determination by a human checking the image visually instead of the controller 20 making the determination, so that the controller 20 makes a determination of whether or not the state is a focus state on the basis of the determination result.

When the state is determined to be not a focus state (NO in step S104), the light sheet microscope 100 adjusts the relative position between the light sheet plane and the objective 7 in the optical axis directions of the objective 7 (step S105). In this example, the controller 20 controls the Z drive unit 8 so as to adjust the relative position between the light sheet plane and the objective 7. Thereafter, an image of sample S is again obtained (step S103). Thereafter, until the state is determined to be a focus state (YES in step S104), the processes in step S103 through step S105 are repeated. Note that this focus determination process does not have to be performed on an entire image that has been obtained. The process may be performed on part of an image obtained by using some of image pickup elements included in the image pickup device 12.

When the state is determined to be a focus state, the light sheet microscope 100 calculates a focus evaluation value (step S106). In this example, the controller 20 performs a prescribed computation on the basis of output signals from the photodetector 15 and the photodetector 17 that detected a laser beam scattered on the light sheet plane, and thereby a focus evaluation value is calculated. A focus evaluation value is a value that changes in accordance with a degree to which the focal plane of the objective 7 and the light sheet plane coincide. A focus evaluation value may be calculated from for example (A−B)/(A+B), where A represents an output signal value from the photodetector 15 and B represents an output signal value from the photodetector 17 although this example is not limitative particularly.

Thereafter, the light sheet microscope 100 sets a reference range from a value calculated in step S106 (step S107). A value calculated in step S106 is a focus evaluation value calculated in a focus state. Accordingly when a focus evaluation value is in a prescribed range including a value calculated in step S106, the light sheet microscope 100 can determine that the state is a focus state. Accordingly, in step S107, a reference range is set in order to use a prescribed range including a value calculated in step S106 in a step that will be described later.

Next, the light sheet microscope 100 adjusts the relative position between the light sheet plane and sample S in the optical axis directions of the objective 7 so that the light sheet plane moves to the initial position (step S108). In this example, the controller 20 controls the stage 6 to move the light sheet plane to the initial position, which is one of positions, determined in step S101, at which cross-sectional images are obtained.

After the relative position between the light sheet plane and sample S is changed by the stage 6, the light sheet microscope 100 performs a focus process (step S109). In this example, the controller 20 performs a focus process in which the Z drive unit 8 is controlled on the basis of light that is from the light sheet plane and that is detected via the objective 7 so that the light sheet plane and the focal plane of the objective 7 become closer (which will be referred to as a first focus process hereinafter).

Specifically, as shown in FIG. 4, the light sheet microscope 100 first calculates a focus evaluation value (step S201). This process is similar to step S106. Next, the light sheet microscope 100 determines whether or not the focus evaluation value calculated in step S201 is in the reference range set in step S107 (step S202). This process is performed because there is a possibility that a movement of the stage 6 in step S108 has moved the focal plane of the objective 7. Note that the process in step S202 is similar to that in step S104 in that whether or not the state is a focus state is determined, but is different in that a focus determination is performed on the basis of output signals from the photodetector 15 and the photodetector 17, from that in step S104, in which the focus determination is performed on the basis of an image obtained by the image pickup device 12.

When the focus evaluation value is determined to be not in the reference range in step S202, the light sheet microscope 100 adjusts the relative position between the light sheet plane and the objective in the optical axis directions of the objective 7 (step S203). In this example, the controller 20 adjusts the relative position between the light sheet plane and the objective 7 by controlling the Z drive unit 8 in such a manner that the focus evaluation value becomes closer to the reference value.

The light sheet microscope 100 later calculates a focus evaluation value again (step S201). Thereafter, until the focus evaluation value is determined to be in the reference range, i.e. until the focus evaluation value becomes a value that is in a prescribed range, the processes in step S201 through step S203 are repeated.

When the focus process is terminated, i.e. when the focus evaluation value is determined to be in the reference range, the light sheet microscope 100 performs a spherical aberration correction process (step S110). In this example, the controller 20 performs a spherical aberration correction process in which the correction collar 18 is controlled so that the evaluation value of an image of sample S obtained by the image pickup device 12 becomes greater.

Specifically, as shown in FIG. 5, the light sheet microscope 100 obtains an image of a sample (step S301) so as to calculate an image evaluation value (step S302). In this example, the controller 20 calculates an image evaluation value from an image obtained by the image pickup device 12. An image evaluation value is a value that changes in accordance with a degree to which a spherical aberration is corrected, and is for example a value representing the contrast or the brightness of an image.

Next, the light sheet microscope 100 determines whether or not an image evaluation value has been calculated with a plurality of prescribed correction values (step S303). A correction value is a value that determines the amount of spherical aberration corrected by the correction device (i.e. a correction amount), and is for example a set value of the correction device. A plurality of prescribed correction values are a plurality of set values selected from a set value range that can be set for the correction device, and are for example a plurality of set values that were selected at constant set value intervals. In this example, the controller 20 obtains images by the image pickup device 12 with the correction collar 18 set for each of the plurality of prescribed set values, and determines whether or not the image evaluation value of the each of the obtained images has been calculated.

When it is determined in step S303 that image evaluation values have not been calculated with a plurality of prescribed correction values, the light sheet microscope 100 adjusts the correction value of the correction device (step S304). In this example, the controller 20 changes the set value of the correction collar 18 to a set value with which an image evaluation value has not been calculated from among the plurality of prescribed set values.

The light sheet microscope 100 thereafter obtains an image of the sample (step S301), and calculates the image evaluation value (step S302). Then, the processes from step S301 through step S304 are repeated until it is determined that the image evaluation values have been calculated with the plurality of prescribed correction values.

When it is determined that the image evaluation values have been calculated with the plurality of prescribed correction values, the light sheet microscope 100 adjusts the correction value of the correction device to a correction value that leads to the maximum image evaluation value (step S305). In this example, the controller 20 first calculates a set value that leads to the maximum image evaluation value, on the basis of a plurality of prescribed set values and a plurality of image evaluation values calculated in step S302. For example, it is also possible to select the maximum image evaluation value from among the plurality of image evaluation values calculated in step S302 so as to calculate the set value of the correction collar 18 corresponding to the selected image evaluation value as the set value leading to the maximum image evaluation value. It is also possible to calculate a relationship between the image evaluation value and a set value from combinations between a plurality of image evaluation values calculated in step S302 and a plurality of set values corresponding to these image evaluation values so as to estimate a set value that leads to the maximum image evaluation value on the basis of the calculated relationship. Thereafter, the controller 20 changes the set value of the correction collar 18 to a set value that leads to the maximum image evaluation value. Thereby, the spherical aberration is corrected.

When the spherical aberration correction process is terminated, the light sheet microscope 100 obtains a cross-sectional image, which is an image of sample S (step S111). Thereby, a cross-sectional image is obtained with the focal plane of the objective 7 and the light sheet plane coinciding and with the spherical aberration having been corrected.

Thereafter, the light sheet microscope 100 determines whether or not the light sheet plane has moved to the final position (step S112). In this example, the controller 20 determines whether or not the light sheet plane has moved to the final position, which is one of positions, determined in step S101, at which cross-sectional images are obtained.

When determining that the light sheet plane has not moved to the final position, the light sheet microscope 100 adjusts the relative position between the light sheet plane and sample S in the optical axis directions of the objective 7 (step S113). In this example, the controller 20 controls the stage 6 to move the light sheet plane to a next position from among positions, determined in step S101, at which cross-sectional images are obtained. Thereafter, the light sheet microscope 100 repeats the processes from step S109 through step S113, and, when it is determined in step S112 that the light sheet plane has moved to the final position, the light sheet microscope 100 terminates the cross-sectional image obtainment process shown in FIG. 3.

In the light sheet microscope 100, the controller 20 performs a focus process when the stage 6 has changed the relative position between the light sheet plane and sample S. Specifically, a focus state is determined on the basis of an output signal from a photodetector that is obtained after changing the relative position between the light sheet plane and sample S. This makes it possible to make the light sheet plane coincide with the focal plane of the objective 7 more swiftly than in a case when a focus state is determined by a human on the basis of an image. The calculation amount is smaller even than a case when a focus state is determined by a control device on the basis of an image, making it possible to swiftly make the light sheet plane coincide with the focal plane of the objective 7.

Also, in the light sheet microscope 100, the controller 20 performs a spherical aberration correction process when the Z drive unit 8 has changed the relative position between the light sheet plane and the objective 7. Specifically, after making the light sheet plane coincide with the focal plane of the objective 7, the set value of the correction collar 18 is changed on the basis of an image obtained by the image pickup device 12. Thereby, it is possible to correct a spherical aberration caused by a change in a component ratio of the medium between the objective and the light sheet plane.

Also, in the light sheet microscope 100, combinations of two detectors and two pinhole plates make it possible to discriminate between a state in which the focus is on a point closer to the lens than the intended point and a state in which the focus is on a point farther from the lens than the intended point. This makes it possible to learn a direction in which a difference has been caused between the focal plane of the objective 7 and the light sheet plane so as to determine the direction in which the relative position between the light sheet plane and the objective 7 is to be adjusted. This point as well contributes to making the light sheet plane coincide with the focal plane of the objective 7 swiftly.

Further, in the light sheet microscope 100, each time the relative position between the light sheet plane and sample S is changed, a focus process is performed on the basis of a signal detected actually at that relative position. This make it possible to make the light sheet plane coincide with the focal plane of the objective 7 more highly accurately than in a case when a focus process is performed on the basis of calibration data. Note that step S109 for the focus process does not have to be performed each time the relative position between the light sheet plane and sample S is changed, but can be set in accordance with a target throughput or necessary accuracy.

As described above, the light sheet microscope 100 makes it possible to make the focal plane of an objective 7 coincide with a light sheet plane highly accurately and swiftly while correcting a spherical aberration that changes in accordance with the light sheet plane.

Note that while explanations have been give only for a case where sample S is moved in the directions of the optical axis of the objective 7, when sample S is large, an image may be picked up while relatively moving sample S in the directions orthogonal to the optical axis of the objective 7 with respect to the light sheet. In such a case, there is a possibility that the refractive index will change depending upon the position in sample S so as to shift the focal plane of the objective 7, however the present method can bring the light sheet plane into focus also in such a case.

Also, for the light sheet microscope 100, an example has been shown in which the controller 20 calculates a focus evaluation value by a software process so as to control the Z drive unit 8, however it is also possible for example to evaluate a focus evaluation value by using a circuit such as a comparator instead of the controller 20 so as to output a control signal in accordance with the evaluation result to the Z drive unit 8. In such a case, a focus process can be performed more speedily than in case of software processes.

Figure 6:
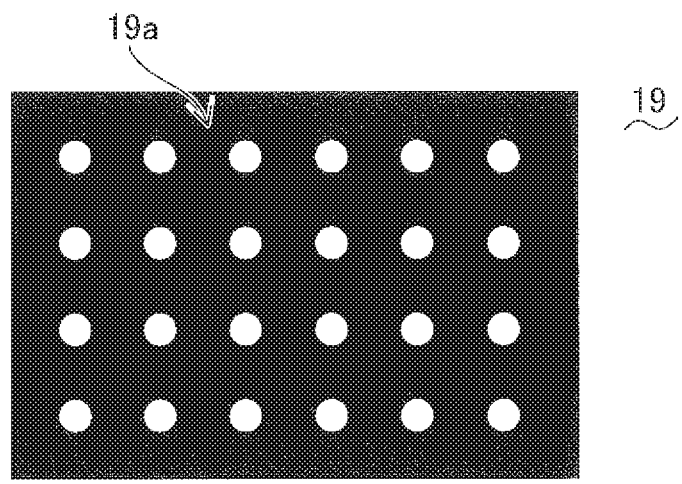

Also, for the light sheet microscope 100, a case has been shown in which the pinhole plates 14 and 16 are included, however it is also possible for example to include, instead of each of the pinhole plates 14 and 16, a light shielding plate 19 having a pinhole array 19a as shown in FIG. 6. Using the light shielding plate 19 makes it possible to detect light from many points in sample S. This can reduce influence caused by an exceptional point (location with a little scattering) in sample S, making it possible to obtain a focus determination result that is more reliable.

Also, for the light sheet microscope 100, an example has been shown in which each time the relative position between the light sheet plane and the sample is adjusted, the controller 20 performs a focus process, however such operations may be implemented by the controller 20 performing continuous auto focus (which will be referred to as continuous AF hereinafter) process. Specifically, the controller 20 may perform a continuous AF process of continuously controlling the Z drive unit 8 so that the light sheet plane and the focal plane become closer, on the basis of light that is from the light sheet plane and that is detected by the photodetector 15 and the photodetector 17 via the objective 7.

Also, for the light sheet microscope 100, an example has been shown in which a spherical aberration correction process obtains images of a sample with a plurality of prescribed correction values and thereby calculates a correction value that leads to the maximum image evaluation value, however the spherical aberration correction process is not limited to this method particularly. For example, an arbitrary searching method such as a hill-climbing method etc. may be used so as to calculate a correction value that leads to the maximum image evaluation value.

Also, for the light sheet microscope 100, an example has been shown in which each time the relative position between the light sheet plane and the sample changes, the spherical aberration correction process obtains an image for calculating a correction value, however image obtainment does not have to be performed at all relative positions. It is sufficient to obtain an image in order to calculate correction values at least two relative positions, and correction values at other relative positions may be calculated by interpolation etc. from the correction values at the at least two relative positions that have already been calculated. This can greatly reduce the number of times of obtaining images, also reducing a time required to correct the spherical aberration. Also, because the number of times of irradiating a light sheet for obtaining images is reduced, damage to sample S can be suppressed.

[Second Embodiment]

FIG. 7 is a flowchart showing procedures of a cross-sectional-image obtainment process according to the present embodiment. The light sheet microscope according to the present embodiment (which will be referred to simply as a light sheet microscope hereinafter) is similar to the light sheet microscope 100 except that the controller 20 performs the cross-sectional-image obtainment process shown in FIG. 7 instead of the cross-sectional-image obtainment process shown in FIG. 3. Note that the cross-sectional-image obtainment process shown in FIG. 7 is different from the cross-sectional-image obtainment process shown in FIG. 3 in that a focus process is performed again after a spherical aberration correction process.

When starting a cross-sectional-image obtainment process, the light sheet microscope first receives specifying of a height range in which cross-sectional images are obtained (step S401). This process is similar to that in step S101 shown in FIG. 3. Next, the light sheet microscope performs a reference range setting process (step S402), and thereafter adjusts the relative position between the light sheet plane and sample S in the optical axis directions of the objective 7 so that the light sheet plane moves to the initial position (step S403). The reference range setting process is similar to those from step S102 through step S107 shown in FIG. 3 and the process in step S403 is similar to that in step S108 shown in FIG. 3. Thereafter, the light sheet microscope performs a focus process (step S404) and further performs a spherical aberration correction process (step S405). These processes are similar to those in step S109 and step S110 shown in FIG. 3.

When the spherical aberration correction process is terminated, the light sheet microscope again performs a focus process (step S406). In other words, the controller 20 performs a focus process of controlling the Z drive unit 8 on the basis of light that is from the light sheet plane and that is detected via the objective 7 so that the light sheet plane and the focal plane of the objective 7 become closer (which will be referred to as a second focus process etc.) when the spherical aberration is corrected by the correction collar 18. Note that the contents of the second focus process are similar to that of the first focus process in step S404.

A second focus process is performed because a setting of the correction collar 18 may sometimes change the focal length when some types of the objective 7 is used. When a spherical aberration correction process is performed while the objective 7 whose focal length changes depending upon a setting of the correction collar 18 is being used, a change in the set value of the correction collar 18 moves the focal plane in the optical axis directions. This sometimes results in a situation where the light sheet plane and the focal plane that have been made to coincide by the first focus process are shifted again. The second focus process is for dealing with this difference.

In ordinary microscopes, even when a spherical aberration correction process has moved the focal plane of the objective 7 slightly, images that are bright and of high quality can be obtained if the spherical aberration has been corrected on the focal plane after being moved. By contrast, in the light sheet microscope, even a slight movement of the focal plane of the objective 7 will shift the focal plane from the light sheet plane, resulting in dark images. Accordingly, performing a focus process again after a spherical aberration correction process is effective particularly for light sheet microscopes.

When the second focus process is terminated, the light sheet microscope obtains a cross-sectional image, which is an image of sample S (step S407), and determines whether or not the light sheet plane has moved to the final position (step S408). When determining that the light sheet plane has not moved to the final position, the light sheet microscope adjusts the relative position between the light sheet plane and sample S in the directions of the objective 7 (step S409). Note that the processes from step S407 through step S409 are similar to those in step S111 through step S113 shown in FIG. 3.

Thereafter, the light sheet microscope repeats the processes from step S404 through step S409, and terminates the cross-sectional-image obtainment process shown in FIG. 7 when it is determined in step S408 that the light sheet plane has moved to the final position.

The light sheet microscope according to the present embodiment as well can make the focal plane of the objective 7 coincide with the light sheet plane swiftly and highly accurately while correcting a spherical aberration that changes in accordance with the light sheet plane, similarly to the light sheet microscope 100. In particular, according to the light sheet microscope of the present embodiment, because a focus process is again performed after a spherical aberration correction process, the above effects can be achieved even when an objective whose focal length changes depending upon the set value of the correction collar 18 is used.

The light sheet microscope according to the present embodiment as well allows various modifications similarly to the light sheet microscope 100. For example, focus processes of step S404 and step S406 may be performed by the controller 20 performing a continuous AF process.

[Third Embodiment]

Figure 8:
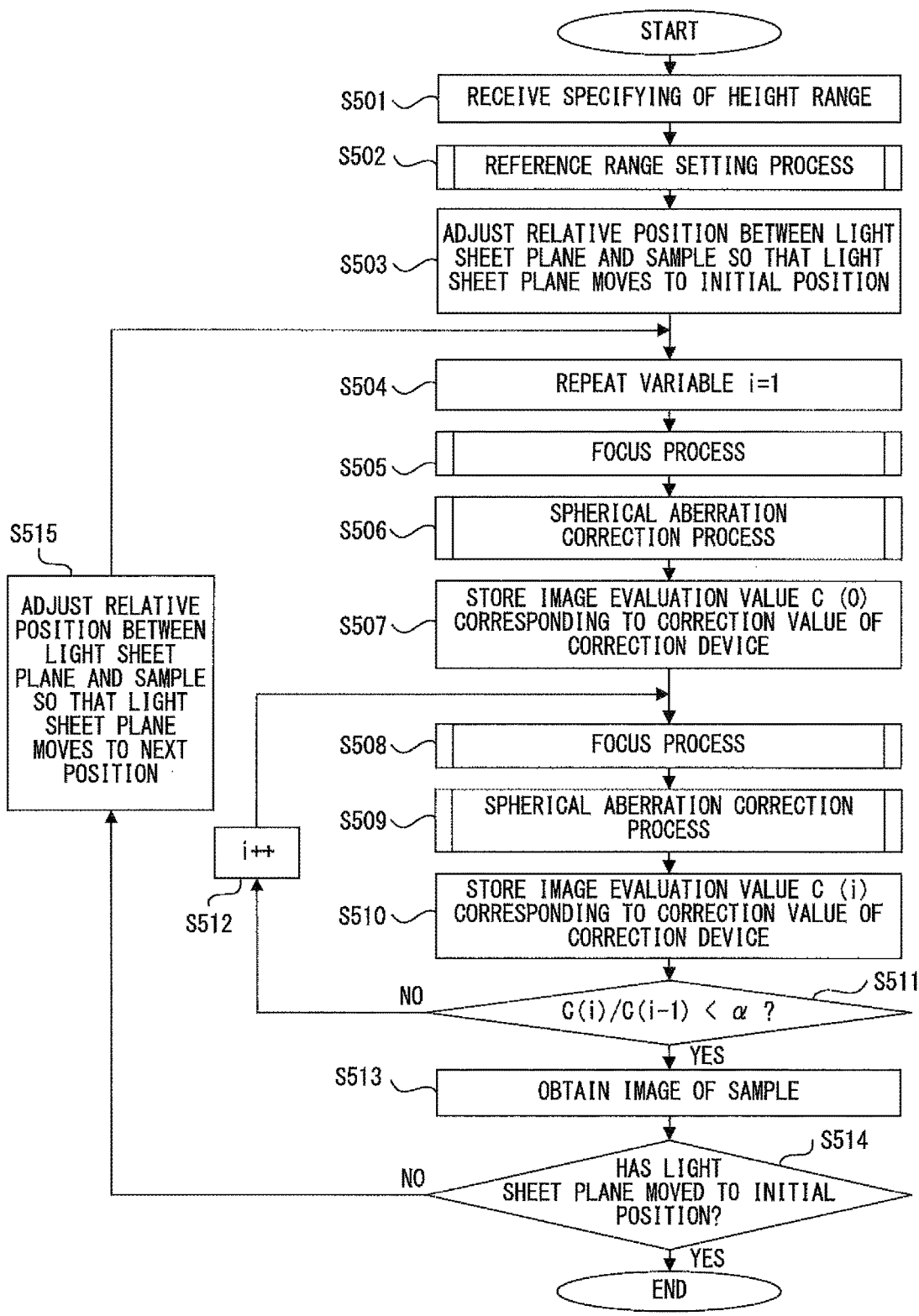
FIG. 8 is a flowchart showing procedures of a cross-sectional-image obtainment process according to the third embodiment.

FIG. 8 is a flowchart showing procedures of a cross-sectional-image obtainment process according to the present embodiment. The light sheet microscope according to the present embodiment (which will be referred to simply as a light sheet microscope hereinafter) is similar to the light sheet microscope 100 except that the controller 20 performs the cross-sectional-image obtainment process shown in FIG. 8 instead of the cross-sectional-image obtainment process shown in FIG. 3. Note that the cross-sectional-image obtainment process shown in FIG. 8 is different from the cross-sectional-image obtainment process shown in FIG. 3 in that the spherical aberration correction process and the focus process are repeated until a prescribed condition is satisfied.

When starting a cross-sectional-image obtainment process, the light sheet microscope first receives specifying of a height range in which cross-sectional images are obtained (step S501). This process is similar to that in step S101 shown in FIG. 3. Next, light sheet microscope performs a reference range setting process (step S502). Thereafter, the light sheet microscope adjusts the relative position between the light sheet plane and sample S in the optical axis directions of the objective 7 so that the light sheet plane moves to the initial position (step S503). The reference range setting process is similar to those in step S102 through step S107 shown in FIG. 3, and the process in step S503 is similar to that in step S108 shown in FIG. 3.

When the relative position between the light sheet plane and sample S has been adjusted, the light sheet microscope sets repeat variable i to "1" (step S504). Thereafter, the light sheet microscope performs a focus process (first focus process) (step S505) and a spherical aberration correction process (step S506). These processes are similar to those in step S109 and step S110 shown in FIG. 3. When the spherical aberration correction process is terminated, the light sheet microscope stores image evaluation value C (0), which corresponds to the correction value of the correction device set in the spherical aberration correction process (step S507). In this example, the controller 20 makes the memory 22 store image evaluation value C (0).

When image evaluation value C (0) is stored, the light sheet microscope performs a focus process (second focus process) (step S508), and performs a spherical aberration correction process (step S509). When spherical aberration correction process is terminated, the light sheet microscope stores image evaluation value C (i), which corresponds to the correction value of the correction device set in the spherical aberration correction process (step S510). In this example, the controller 22 makes the memory 22 store image evaluation value C (i). Note that the processes from step S508 through step S510 are similar to those from step S505 through step S507.

When image evaluation value C (i) is stored, the light sheet microscope determines whether or not a prescribed condition is satisfied (step S511). In this example, the controller 20 reads image evaluation value C (i) and image evaluation value C (i-1) from the memory 22 so as to determine whether or not a prescribed condition of C (i)/C (i-1)<α is satisfied.

C (i)/C (i-1) is a ratio between image evaluation value C (i), which was calculated in the spherical aberration correction process performed immediately before, and image evaluation value C (i-1), which was calculated in a spherical aberration correction process that had been performed before the immediately-before spherical aberration correction process, and represents how much change occurred in the image evaluation value between before and after the execution of a combination of a focus process and a spherical aberration correction process. When an objective whose focal length changes depending upon the set value of the correction collar 18 is used, image evaluation values usually converge toward a constant value that is obtained with the spherical aberration having been corrected and in a focus state by repeating a focus process and a spherical aberration correction process. Accordingly, in step S511, whether or not C (i)/C (i-1) has become closer to one sufficiently is determined so as to determine whether or not the value has converged. Note that α is for example 1.1, although the value is not limited particularly.

When it is determined that the prescribed condition is not satisfied, the light sheet microscope increments repeat variable i (step S512), and thereafter, repeats the processes between step S508 through step S512 until the prescribed condition is satisfied. In other words, the controller 20 repeats a second focus process and a spherical aberration correction process until the prescribed condition is satisfied, i.e. until a state that is a focus state and that has a corrected spherical aberration is obtained.

When it is determined that the prescribed condition is satisfied, the light sheet microscope obtains a cross-sectional image, which is an image of sample S (step S513), and determines whether or not the light sheet plane has moved to the final position (step S514). When it is determined that the light sheet plane has not moved to the final position, the light sheet microscope adjusts the relative position between the light sheet plane and sample S in the optical axis directions of the objective 7 (step S515). Note that the processes from step S513 through step S515 are similar to those from step S111 through step S113 shown in FIG. 3.

Thereafter, the light sheet microscope repeats the processes from step S504 through step S515, and terminates the cross-sectional-image obtainment process shown in FIG. 8 when it is determined in step S514 that the light sheet plane has moved to the final position.

The light sheet microscope according to the present embodiment as well can make the focal plane of the objective 7 coincide with the light sheet plane swiftly and highly accurately while correcting a spherical aberration that changes in accordance with the light sheet plane, similarly to the light sheet microscope 100. The light sheet microscope according to the present embodiment particularly makes it possible to obtain, by repeating a focus process and a spherical aberration correction process, a state that is a focus state and that has a corrected spherical aberration even when an objective whose focal length changes depending upon the set value of the correction collar 18 is used.

Also, the light sheet microscope according to the present embodiment as well allows various modifications similarly to the light sheet microscope 100. For example, the focus processes in step S505 and step S508 may be performed by the controller 20 performing a continuous AF process.

Also, for the light sheet microscope according to the present embodiment, an example has been shown, as a prescribed condition for terminating the repeat of a focus process and a spherical aberration correction process, in which a ratio of (C (i)/C (i-1)) between correction values is used, however the prescribed condition is not limited to this example particularly. A condition that allows a determination of whether or not the state is a state that is a focus state and that has a corrected spherical aberration is sufficient.

[Fourth Embodiment]

Figure 9:
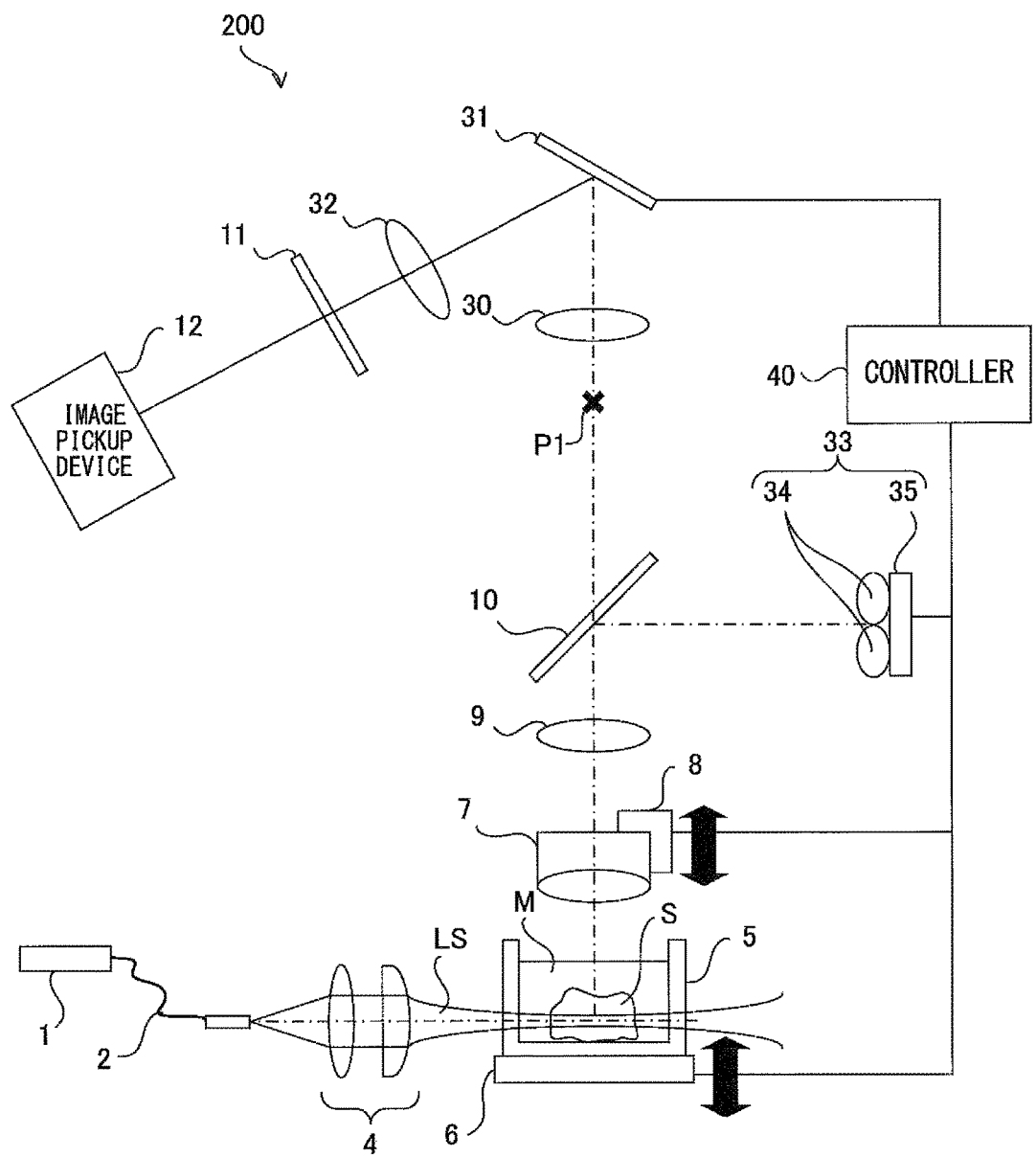
FIG. 9 exemplifies a configuration of a light sheet microscope 200 according to the fourth embodiment.

FIG. 9 exemplifies a configuration of a light sheet microscope 200 according to the present embodiment. The light sheet microscope 200 is different from the light sheet microscope 100 in that it includes a lens 30, an LCOS-SLM (Liquid Crystal On Silicon-Spatial Light Modulator) 31 and a lens 32 instead of the correction collar 18, that it includes a phase difference AF sensor 33 instead of the beam splitter 13 and the two pinhole plates and the two photodetectors and that it includes a controller 40 instead of the controller 20. The other points are similar to those of the light sheet microscope 100.

The lens 30 is a lens that constitutes a pupil relay optical system together with the tube lens 9, and is configured to project the pupil of the objective 7 on the LCOS-SLM 31. The LCOS-SLM 31 is a correction device that corrects a spherical aberration. The LCOS-SLM 31 is a programmable pupil modulator arranged between the objective 7 and the image pickup device 12, and is arranged at a position that is optically conjugate with the pupil position of the objective 7. The lens 32 is a lens that constitutes an image relay optical system together with the lens 30, and is configured to project, on the image pickup device 12, an image of sample S formed at position P1.

The phase difference AF sensor 33 is a sensor unit that includes a separator lens 34 and a sensor 35 and that performs a phase difference AF process, and is provided in an optical path branching from the optical path between the image pickup device 12 and the objective 7.

The controller 40 is different form the controller 20 in that it is connected to the LCOS-SLM 31 and the phase difference AF sensor 33, that the LCOS-SLM 31 is controlled so that a spherical aberration is corrected, and that the Z drive unit 8 is controlled on the basis of an output signal form the phase difference AF sensor 33. The hardware configuration of the controller 40 is similar to that of the controller 20. Also, the controller 40 is similar to the controller 20 also in that it is configured to perform the cross-sectional-image obtainment process shown in FIG. 3. However, the controller 40 performs a focus process on the basis of an output signal from the phase difference AF sensor 33 and controls the LCOS-SLM 31 so as to perform a spherical aberration correction process, differently from the controller 20.

The light sheet microscope 200 as well can make the focal plane of the objective 7 coincide with the light sheet plane swiftly and highly accurately while correcting a spherical aberration that changes in accordance with the light sheet plane, similarly to the light sheet microscope 100. Also, the light sheet microscope 200 includes the LCOS-SLM 31 instead of the correction collar 18 as a correction device, making is possible to correct a spherical aberration without being requiring mechanical driving. This makes it possible to correct a spherical aberration speedily. It is further possible to correct a spherical aberration in such a manner that the focal point will not move. Further, the durability is high, making it possible to provide a device that has a long lifetime and high reliability. Further, according to the light sheet microscope 200, by detecting a focus state by using the phase difference AF sensor 33, it is possible to make the configurations of the optical systems simpler than those of the light sheet microscope 100. This makes it possible to configure the device at a lower cost.

The above embodiments are specific examples shown in order to facilitate the understanding, and the embodiments of the present invention are not limited to them. The light sheet microscope and the control method thereof allow various modifications and changes without departing from the claims.

The light sheet microscope 100 may be modified so as to include, as a structure for detecting a focus state, the phase different AF sensor 33 instead of the beam splitter 13, the two pinhole plates and the two photodetectors. The light sheet microscope 100 may include, as a structure for detecting a focus state, an image plane phase difference sensor instead of the beam splitter 13, the two pinhole plates and the two photodetectors, and the image plane phase difference sensor may be provided in the image pickup device 12. The light sheet microscope 200 may include, as a structure for detecting a focus state, an image plane phase difference sensor instead of the phase difference AF sensor 33, and the image plane phase difference sensor may be provided in the image pickup device 12.

What is claimed is:

1. A light sheet microscope comprising:
   an objective;
   an illumination optical system that irradiates a sample with a light sheet from a direction that is different from an optical axis direction of the objective;
   a correction device for correcting a spherical aberration;
   an image pickup device that obtains an image of the sample via the objective;
   a first adjustor that adjusts a first relative position between a light sheet plane on which the light sheet is formed and the objective in the optical axis direction of the objective;
   a second adjustor that adjusts a second relative position between the light sheet plane and the sample in the optical axis direction of the objective; and
   a controller that performs a first focus process and a spherical aberration correction process, the first focus process being a process in which the first adjustor is controlled based on light that is from the light sheet plane and that is detected via the objective so that the light sheet plane and a focal plane of the objective become closer when the second adjustor has changed the second relative position between the light sheet plane and the sample, and the spherical aberration correction process being a process in which the correction device is controlled so that an evaluation value of the image of the sample obtained by the image pickup device becomes greater when the first adjustor has changed the first relative position between the light sheet plane and the objective.

2. The light sheet microscope according to claim 1, wherein the controller further performs a second focus process in which the first adjustor is controlled based on the light that is from the light sheet plane and that is detected via the objective so that the light sheet plane and the focal plane become closer when the correction device has corrected a spherical aberration.

3. The light sheet microscope according to claim 2, wherein the controller further repeats the second focus process and the spherical aberration correction process until a prescribed condition is satisfied.

4. The light sheet microscope according to claim 1, wherein the controller performs a continuous auto focus (AF) process in which the first adjustor is continuously controlled based on the light that is from the light sheet plane and that is detected via the objective so that the light sheet plane and the focal plane become closer.

5. The light sheet microscope according to claim 1, wherein the evaluation value is a value representing contrast or brightness of the image of the sample.

6. The light sheet microscope according to claim 1, wherein the correction device is an electric correction collar that moves a lens constituting the objective in the optical axis direction.

7. The light sheet microscope according to claim 1, wherein the correction device is a pupil modulator that is arranged between the objective and the image pickup device.

8. The light sheet microscope according to claim 7, wherein the pupil modulator is an LCOS-SLM (Liquid Crystal On Silicon-Spatial Light Modulator).

9. The light sheet microscope according to claim 1, further comprising:
   a first light shielding plate that is arranged on a far side of a first position and that has an opening, wherein the first position is in an optical path branching from an optical path between the image pickup device and the objective and corresponds to a light-receiving surface of the image pickup device,
   a second light shielding plate that is arranged on a near side of a second position and that has an opening, wherein the second position is in an optical path branching from an optical path between the image pickup device and the objective and corresponds to the light-receiving surface, a first photodetector that detects light that is from the light sheet plane and that has passed through the first light shielding plate, and a second photodetector that detects detecting light that is from the light sheet plane and that has passed through the second light shielding plate, wherein the control device performs the first focus process based on an output signal from the first photodetector and an output signal from the second photodetector.

10. The light sheet microscope according claim 1, further comprising:

a phase difference auto focus (AF) sensor provided in an optical path branching from an optical path between the image pickup device and the objective, wherein the controller performs the first focus process based on an output signal from the phase difference AF sensor.

11. The light sheet microscope according to claim 2, wherein the controller performs a continuous auto focus (AF) process in which the first adjustor is continuously controlled based on the light that is from the light sheet plane and that is detected via the objective so that the light sheet plane and the focal plane become closer.

12. The light sheet microscope according to claim 3, wherein the controller performs a continuous auto focus (AF) process in which the first adjustor is continuously controlled based on the light that is from the light sheet plane and that is detected via the objective so that the light sheet plane and the focal plane become closer.

13. The light sheet microscope according to claim 2, wherein the evaluation value is a value representing contrast or brightness of the image of the sample.

14. The light sheet microscope according to claim 3, wherein the evaluation value is a value representing contrast or brightness of the image of the sample.

15. The light sheet microscope according to claim 4, wherein the evaluation value is a value representing contrast or brightness of the image of the sample.

16. The light sheet microscope according to claim 2, wherein the correction device is an electric correction collar that moves a lens constituting the objective in the optical axis direction.

17. The light sheet microscope according to claim 3, wherein the correction device is an electric correction collar that moves a lens constituting the objective in the optical axis direction.

18. The light sheet microscope according to claim 4, wherein the correction device is an electric correction collar that moves a lens constituting the objective in the optical axis direction.

19. The light sheet microscope according to claim 5, wherein the correction device is an electric correction collar that moves a lens constituting the objective in the optical axis direction.

20. A control method for a light sheet microscope including an objective, a correction device that corrects a spherical aberration, and an image pickup device that obtains an image of a sample, the control method comprising:

irradiating the sample with a light sheet from a direction that is different from an optical axis direction of the objective;

adjusting a first relative position between a light sheet plane on which the light sheet is formed and the sample in an optical axis direction of the objective;

performing a first focus process in which a second relative position between the light sheet plane and the objective is adjusted based on light that is from the light sheet plane and that is detected via the objective so that the light sheet plane and a focal plane of the objective become closer when the first relative position between the light sheet plane and the sample has been adjusted; and performing a spherical aberration correction process in which the correction device is controlled so that an evaluation value of the image of the sample obtained by the image pickup device becomes greater when the second relative position between the light sheet plane and the objective has been adjusted.

* * * * *